May 4, 1926.
R. E. L. JANNEY
1,583,467
DRAFT MECHANISM
Filed April 17, 1922
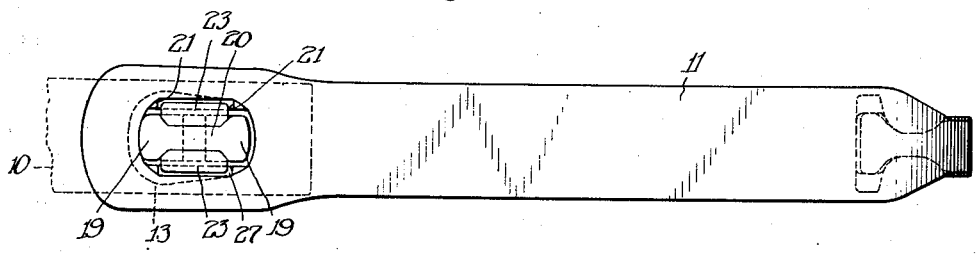
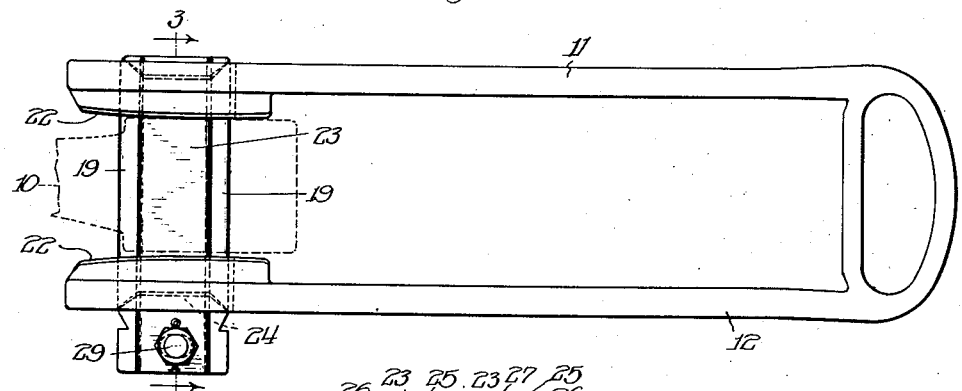
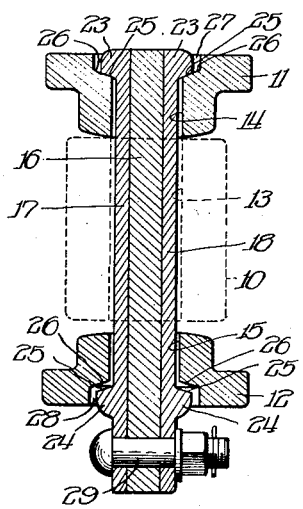
Witness:
R. Burkhardt.
Inventor:
Robert E. L. Janney,
By Wilkinson, Huxley, Byron & Knight
Attys.

Patented May 4, 1926.

1,583,467

UNITED STATES PATENT OFFICE.

ROBERT E. L. JANNEY, OF CHICAGO, ILLINOIS; GARDNER L. BOOTHE, EXECUTOR OF SAID ROBERT E. L. JANNEY, DECEASED, ASSIGNOR TO NANNIE HAMILTON JANNEY, OF ALEXANDRIA, VIRGINIA.

DRAFT MECHANISM.

Application filed April 17, 1922. Serial No. 553,836.

*To all whom it may concern:*

Be it known that I, ROBERT E. L. JANNEY, a citizen of the United States, residing at Chicago, in the county of Cook and State of Illinois, have invented certain new and useful Improvements in Draft Mechanism, of which the following is a specification.

This invention relates to draft mechanism and more particularly to the connection and cooperative action between a coupler shank and yoke.

Heretofore flat vertical keys have been used for connecting a draft yoke and coupler shank, such keys being provided with a head at the upper end so that the weight of the key rests upon the head, the lower end of the key being provided with a cotter pin or bolt to prevent displacement of the key. However, having the head on top as heretofore used, means that the coupler and yoke and draft gear, necessarily, must be taken down as a unit to replace the coupler. This is undesirable, for in most instances the only part which requires repair is the coupler. A great many small repair points along railroad lines can make the repairs to replace couplers quickly, but it doubles or triples the work and the time required if the whole draft gear must be taken down to renew a coupler.

Again, if the upper and lower arms of the yoke are spread apart slightly it is desirable to provide means whereby said yoke arms may be drawn together in a simple manner during the assembling of the parts.

It is also desirable in a connection between the yoke and coupler shank to have a certain amount of flexibility to provide relative movements between the yoke and coupler shank to meet the various angling conditions.

Therefore, one object of the invention is to provide a simple, durable and efficient connection between the coupler shank and yoke which permits of the desired amount of flexibility, which automatically draws the yoke arms together during the assembling action if said yoke arms have been spread slightly, and which makes it possible to readily assemble and disassemble the coupler and draw bar yoke in their normal positions to facilitate repairs of the parts in question.

Another object is to provide a simple keyed connection between a coupler shank and draft yoke adapted to meet the various requirements under service conditions.

These and other objects are accomplished by means of the arrangement disclosed on the accompanying sheet of drawings, in which—

Figure 1 is a top plan view of a yoke connected to a coupler shank by means of my improved connecting means;

Figure 2 is a side elevation of the same; and

Figure 3 is a sectional view taken in the plane of line 3—3 of Figure 2.

The various novel features of the invention will be apparent from the following description and drawings, and will be particularly pointed out in the appended claims.

Referring to the figures of the drawings, it will be noted that I have shown the coupler shank 10 in a draw bar yoke having an upper arm 11 and lower arm 12, said coupler shank 10 and yoke arms 11 and 12 having vertically arranged registering openings 13, 14 and 15 respectively, for the reception of the connecting means between the coupler shank and the draw bar yoke arms 11 and 12.

It is desirable for the weight of the key to be suspended from the head at its upper end, but at the same time it is undesirable to provide the key with such a head at the upper end which will require complete removal of the entire draft gear when it is desired only to replace a coupler.

In solving this problem, I have provided a fabricated connection between the coupler shank and the yoke including three vertical adjacently arranged members 16, 17 and 18, the member 16 being the key proper and being interposed between the members 17 and 18 which I choose to call gibs. The key 16, as will be observed, is of I-shaped section. The enlarged or bulb portions 19 of the I-shaped key are substantially the same width as the ends of the openings 14 and 15 in the yoke arms 11 and 12, respectively, the web portions 20 of the key being reduced sufficiently to permit the reception of the gib members 17 and 18 within said registering openings, it being understood that the gib members 17 and 18 occupy portions of the openings directly adjacent the web portions 20 of the key 16. The yoke arms 11 and 12 have shouldered portions 21 against which the gibs 17 and 18 bear and the gibs 17 and 18, and, as a matter of fact, the whole fabricated key structure fits quite snugly the openings in the yoke arms to give the gibs a maximum amount of gripping surface and to prevent wear of the parts occasioned by relative movement therebetween. In this connection it will be noted that the opening 13 in the coupler shank 10 is wedge shaped and enlarged at the forward end, as shown particularly in Figure 1. This permits the coupler to angle within the yoke arms 11 and 12, the pivotal point between the coupler shank and the key member 19 being at the rear of the key under pulling conditions so that the coupler shank is free to angle laterally within the yoke arms. Not only is such lateral angling permitted, but it will be noted that relative vertical angling movement is permitted between the coupler shank and the yoke arms 11 and 12 as a result of the convex surfaces 22 provided at the front inner portions of the yoke arms which are adapted to be engaged by the coupler shank and upon which the latter may rock, thereby making the connection between the yoke and coupler sufficiently flexible to meet all of the operating requirements.

Referring again more particularly to the gib members 17 and 18, it will be noted that the upper and lower headed portions 23 and 24 thereof are provided with inclined surfaces 25 for cooperating with inclined surfaces 26 formed in the recesses 27 and 28 in the arms 11 and 12, respectively, of the yoke. With these cooperating inclined surfaces it will be appreciated that if the yoke arms are spread apart slightly beyond their normal relative positions the condition will be compensated for.

More specifically, in assembling the parts, the gib member 17 may be passed through the registering openings 13, 14 and 15 and its heads 23 and 24 moved laterally so that the inclined surfaces 25 and 26 may cooperate, this being permitted even though the yoke arms 11 and 12 are spread apart, for example, one-quarter of an inch beyond their normal relative positions. The other gib 18 may then be passed through the registering openings and set in place, whereupon the key part 16 may be inserted between the gibs 17 and 18. If the yoke arms 11 and 12 are spread apart slightly more than is normal, the key part 16, in being set or driven in place, will cause the cooperating inclined surfaces 25 and 26 to engage and climb on one another for drawing the yoke arms into or toward their normal relative positions.

When the gibs and key members are set in place a bolt 29 may be passed through and secured in transverse registering openings in the lower ends of said members.

It will be noted that the yoke is symmetrical so that it may be reversed in the sense that arms 11 and 12 may occupy reversed positions.

It is my intention to cover all modifications of the invention falling within the spirit and scope of the following claims.

I claim:

1. In draft mechanism, the combination of a coupler having a shank, a yoke, said yoke and shank having registering openings, and fabricated means comprising three cooperating vertically arranged members mounted in said openings side by side transversely of the yoke connecting said coupler shank and yoke, two of said members and yoke having cooperating inclined surfaces whereby the yoke arms may be moved toward each other during the assembling operation if said arms are spaced apart beyond a predetermined amount.

2. In draft mechanism, the combination of a yoke having arms, a coupler shank receivable between said arms, said yoke arms and shank having registering openings, and connecting means for said yoke arms and coupler shank including three cooperating parallel arranged members passing through said registering openings side by side transversely of the yoke and certain ones having inclined surfaces cooperating with inclined surfaces on said yoke arms for drawing the yoke arms toward each other if the latter are spread apart beyond a predetermined amount.

Signed at Chicago, Illinois, this 15th day of March, 1922.

ROBERT E. L. JANNEY.